(12) United States Patent
Oolderink et al.

(10) Patent No.: US 9,205,611 B2
(45) Date of Patent: Dec. 8, 2015

(54) COMPOSITE GEAR BLANK

(75) Inventors: Rob Oolderink, Ootmarsum (NL);
Ermanno Nizzoli, Fahrwangen (CH);
Hendrik Vandenbruaene, Tielt (BE)

(73) Assignee: QUADRANT EPP AG, Lenzburg (CH)

( * ) Notice: Subject to any disclaimer, the term of this patent is extended or adjusted under 35 U.S.C. 154(b) by 1031 days.

(21) Appl. No.: 13/256,739

(22) PCT Filed: Mar. 17, 2010

(86) PCT No.: PCT/EP2010/053492
§ 371 (c)(1),
(2), (4) Date: Sep. 15, 2011

(87) PCT Pub. No.: WO2010/106120
PCT Pub. Date: Sep. 23, 2010

(65) Prior Publication Data
US 2012/0000307 A1    Jan. 5, 2012

(30) Foreign Application Priority Data

Mar. 17, 2009  (EP) ..................................... 09003816

(51) Int. Cl.
| | | |
|---|---|---|
| *B29C 39/10* | (2006.01) | |
| *B29D 15/00* | (2006.01) | |
| *B29C 37/00* | (2006.01) | |
| B29L 15/00 | (2006.01) | |
| F16H 55/06 | (2006.01) | |

(52) U.S. Cl.
CPC ............ *B29D 15/00* (2013.01); *B29C 37/0082* (2013.01); *B29C 39/10* (2013.01); *B29L 2015/003* (2013.01); *F16H 55/06* (2013.01); *Y10T 74/19828* (2015.01); *Y10T 428/211* (2015.01)

(58) Field of Classification Search
None
See application file for complete search history.

(56) References Cited

U.S. PATENT DOCUMENTS

| | | | | |
|---|---|---|---|---|
| 1,928,763 | A * | 10/1933 | Rosenberg | 464/99 |
| 2,720,119 | A * | 10/1955 | Sherman | 74/460 |
| 3,180,171 | A | 4/1965 | Arpin | |
| 3,200,665 | A * | 8/1965 | Martin Wells | 74/446 |
| 3,530,735 | A * | 9/1970 | Allen | 74/446 |
| 4,042,434 | A * | 8/1977 | Ivanko | 156/91 |
| 4,366,609 | A * | 1/1983 | Speer | 29/892.3 |
| 5,307,705 | A * | 5/1994 | Fenelon | 74/411 |
| 6,432,343 | B1 * | 8/2002 | Zollondz et al. | 264/255 |
| 6,591,708 | B2 * | 7/2003 | Kobayashi et al. | 74/446 |
| 6,638,390 | B1 | 10/2003 | Sizelove et al. | |
| 6,988,582 | B2 * | 1/2006 | Kitami et al. | 180/444 |

(Continued)

FOREIGN PATENT DOCUMENTS

| | | |
|---|---|---|
| DE | 19630811 C1 | 9/1997 |
| DE | 10127224 A1 | 12/2002 |

(Continued)

*Primary Examiner* — Edmund Lee
(74) *Attorney, Agent, or Firm* — Brooks Kushman P.C.

(57) ABSTRACT

Composite gear blanks are manufactured by placing a rigid centerpiece in a mold, optionally inertizing the mold, filling the mold by adding a liquid reactive mixture around the centerpiece, applying static pressure to the mold and polymerizing the reactive mixture so as to form a plastic outer part surrounding the centerpiece. The composite gear blanks thus made have improved values of normal and shear adhesion strength both at room temperature and at elevated temperatures of up to 120° C. and are particularly suited for making worm gear parts of automotive electronic power steering systems.

16 Claims, 6 Drawing Sheets

(56) References Cited

U.S. PATENT DOCUMENTS

| | | | |
|---|---|---|---|
| 8,595,934 B2 * | 12/2013 | Derse | 29/893.37 |
| 2006/0175123 A1 * | 8/2006 | Yabe et al. | 180/444 |
| 2007/0082547 A1 * | 4/2007 | Komoto et al. | 439/587 |
| 2007/0087617 A1 * | 4/2007 | Oberle | 439/395 |
| 2010/0201030 A1 * | 8/2010 | Oberle | 264/262 |

FOREIGN PATENT DOCUMENTS

| | | |
|---|---|---|
| EP | 0 106 545 A1 | 4/1984 |
| EP | 1 145 830 A2 | 10/2001 |
| EP | 1 609 694 A1 | 12/2005 |
| EP | 1614935 A1 | 1/2006 |
| EP | 1690664 A1 | 8/2006 |
| GB | 272551 | 9/1927 |
| GB | 725451 | 3/1955 |
| JP | 59-059427 | 4/1984 |
| JP | 61-108517 | 5/1986 |
| JP | 55-124654 | 9/1990 |
| JP | 05-96640 | 4/1993 |
| JP | 6-079511 | 11/1994 |
| JP | 07-299875 | 11/1995 |
| JP | 2002333059 A | 11/2002 |
| JP | 2003118006 A | 4/2003 |
| WO | 96/41512 A1 | 12/1996 |
| WO | 2005104692 A2 | 11/2005 |

* cited by examiner

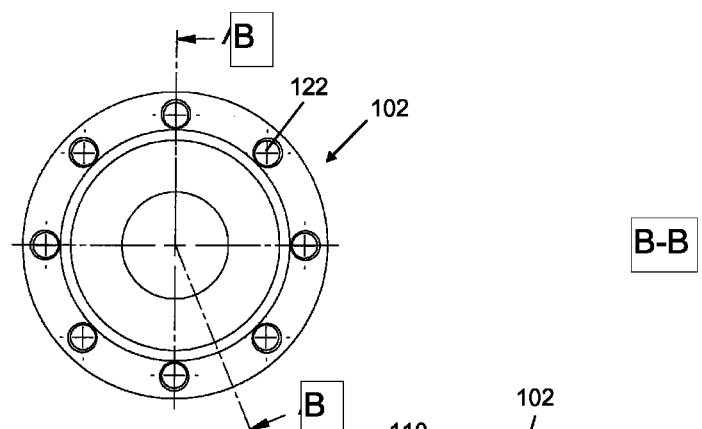
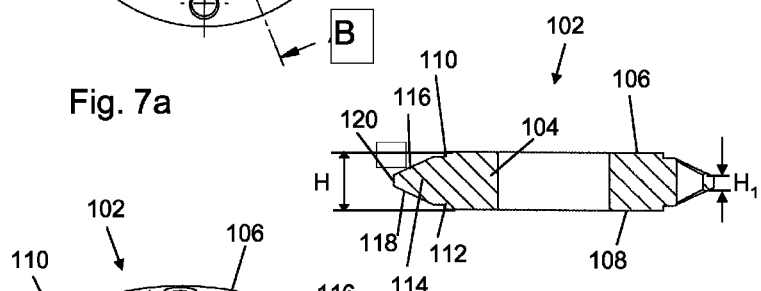
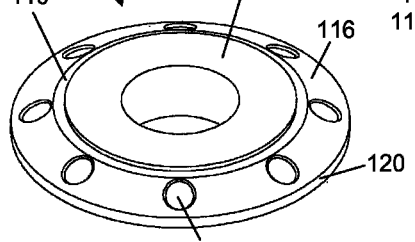
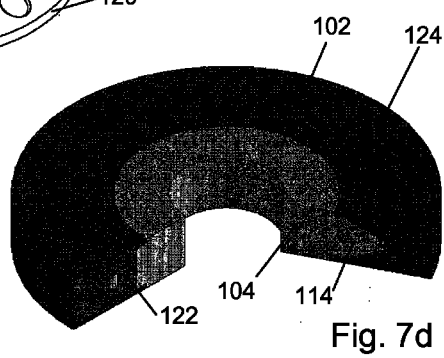
Fig. 7a
Fig. 7b
Fig. 7c
Fig. 7d

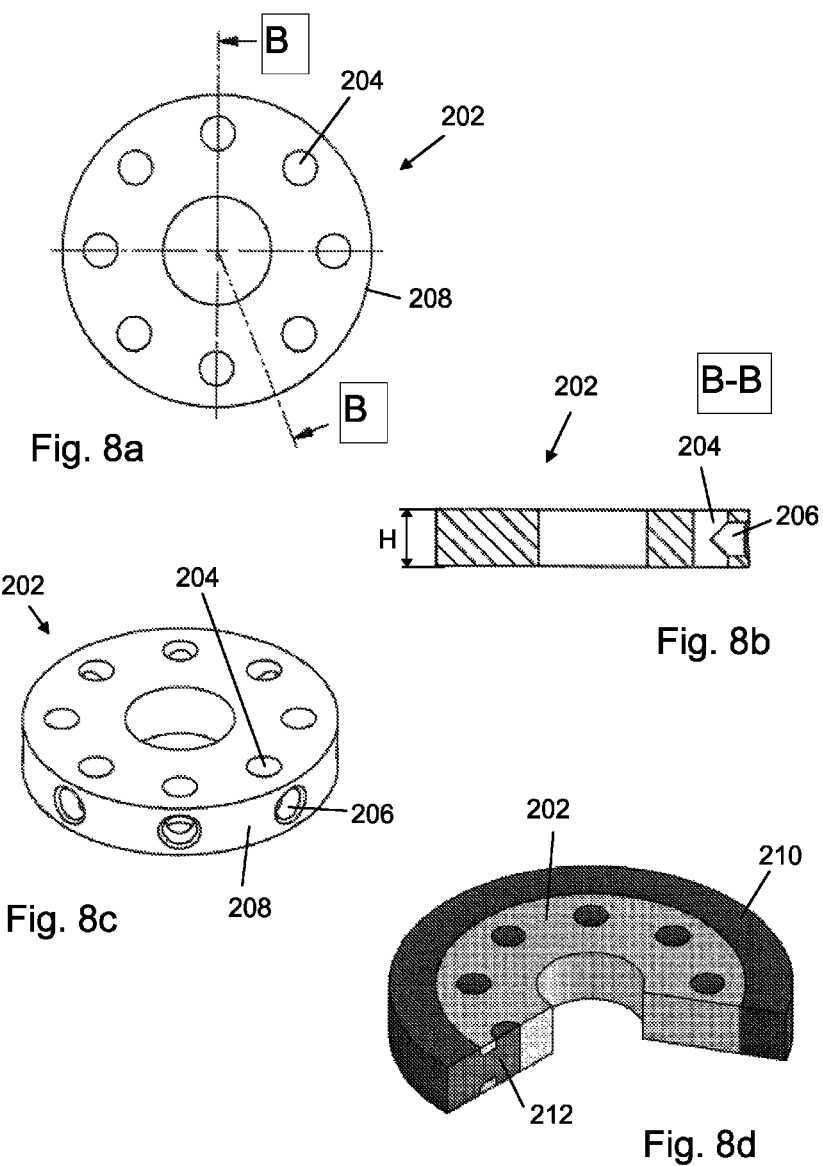

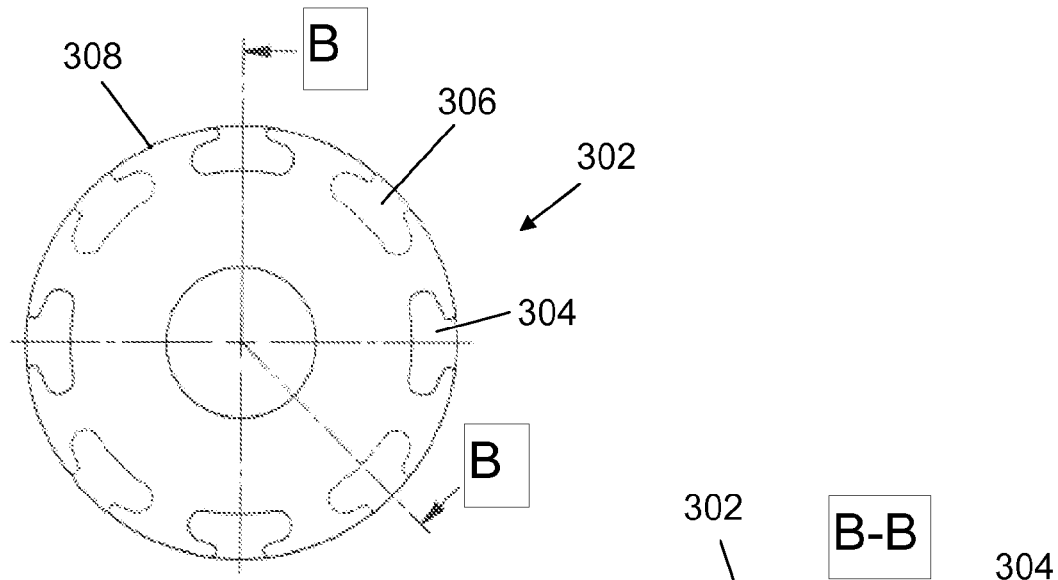
Fig. 9a
Fig. 9b
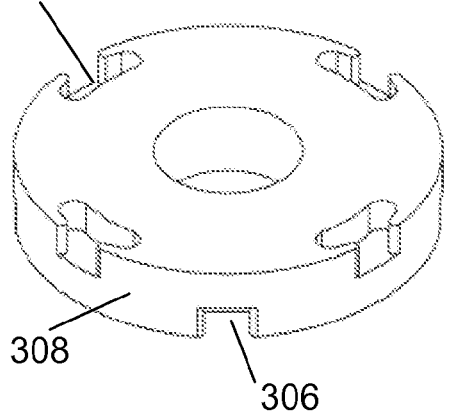
Fig. 9c
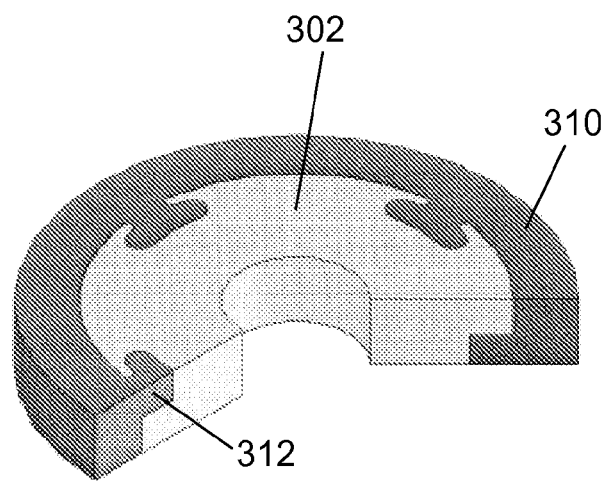
Fig. 9d

COMPOSITE GEAR BLANK

CROSS-REFERENCE TO RELATED APPLICATIONS

This application is the U.S. National Phase of PCT Appln. No. PCT/EP2010/053492 filed Mar. 17, 2010 which claims priority to European application EP 09003816.7 filed Mar. 17, 2009.

BACKGROUND OF THE INVENTION

1. Field of the Invention

The present invention relates to a composite gear blank comprising a rigid centerpiece and an outer part made of a plastic material. The invention also relates to the use of such a composite gear blank and to methods for manufacturing the same.

2. Description of the Related Art

Electronic power steering (EPS) systems eliminate the traditional hydraulic systems' power steering pump, hoses, hydraulic fluid, and drive belt and pulley on the engine. EPS significantly reduces the amount of energy drawn from the engine, thus improving fuel economy, acceleration, and dependability. EPS offers the feel and handling of a traditional hydraulic-powered system, without the loss of power that results from a hydraulic pump running off belts and pulleys driven by the motor.

A typical EPS system has an electric motor, sensors and a worm-gear assembly. The requirements are:
- resistance, during steering maneuvers, to both the maximum input torque and resultant axial force of the worm gear;
- reduction of vibration and noise;
- low friction and precision tolerances for all gear surfaces;
- ability to be press-fit to a steel shaft;
- durability and fatigue resistance for the life of the vehicle.

For reasons of noise reduction, lower coefficient of friction and wear reduction, the toothed peripheral portion of the gear wheel is preferably made of a synthetic, thermoplastic material. On the other hand, the central hub portion is preferably made of metal, so as to allow firm connection of a metallic shaft. As a consequence, this requires production of a composite piece having a plastic outer part firmly attached to a metallic inner part.

To achieve the above task, various approaches have been described in the prior art, see e.g. WO 2005/104692 A2 and references cited therein.

U.S. Pat. No. 6,638,390 B1 discloses a process for manufacturing polymer/metal disks wherein a bonding agent is applied to a metallic hub, followed by pressing a polymeric ring over the metallic hub to form a ring/hub assembly. The assembly thus formed is then heated to cause bonding between the polymeric ring and the metallic hub. A similar process has been disclosed in JP 2003/118 006 A.

EP 1 609 694 A1 relates to an electric power steering device and resin gear used for the same. According to the method described in this document, the plastic ring is made by a separate casting step. Subsequently the ring is heated and press-fitted onto a slightly larger metal core.

EP 1 690 664 A1 describes a method of resin coating an inert member by means of injection molding.

DE 101 27 224 A1 discloses a toothed wheel, especially for a worm gear mechanism, consisting of a metal disc with a central opening for a shaft, a ring shaped plastic element on the circumference of the disc and a toothed crown. In one embodiment, it is contemplated to form the ring shaped plastic element by casting (in German: "formschlüssiges Angiessen") around a massive metallic hub. In another embodiment, it is contemplated to form the plastic element by injection molding (in German: "Spritzgiessen"). However, DE 101 27 224 A1 does not give any detailed information on how to carry out the casting or injection molding processes nor does it show any comparison of the results obtained by the two methods.

U.S. Pat. No. 6,432,343 B1 describes a process of manufacturing rotationally symmetric articles such as rope pulleys, rope sheaves, running wheels and the like, which optionally can have a metallic hub for reinforcement. The manufacturing process involves a centrifugal casting method according to which a first ε-caprolactam melt is poured into a rotating mold. When the reactive melt starts to polymerize, at which time it is also being pushed radially outwards against the peripheral mold surface due to the mold rotation, a second ε-caprolactam melt is poured into the mold for formation of the hub area. This second melt is selected so as to have increased strength properties in comparison to the first melt. As an option, it is contemplated to place a metallic part at the center of the mold so as to form a hub of the rotationally symmetric article.

However, it has been found that the strength of the plastic to metal connection of the composite gear blanks produced according to the various prior art methods does not meet some of the stringent requirements for EPS systems in larger engine cars and/or for EPS-systems located "under the hood", i.e. close to the engine where the operating temperature is typically around 120° C.

Accordingly, it would be highly desirable to have a composite gear blank with a substantially improved adhesion strength between the plastic outer part and the rigid centerpiece, even at elevated temperatures.

Moreover, it would be desirable to have a manufacturing method allowing for an efficient and reliable production of such improved composite gear blanks.

SUMMARY OF THE INVENTION

It is the principal object of the present invention to overcome the limitations and disadvantages of currently known composite gear blanks. The foregoing and further objects are achieved by the composite gear blank of the invention, by the use thereof, and by manufacturing methods therefor. Surprisingly, it was found that extremely strong connections between a plastic outer part and a rigid centerpiece may be achieved by careful selection of the manufacturing steps.

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein:

FIG. 7 shows a third embodiment of a composite gear blank ("UFO-like"): (a) in a plan view of the centerpiece; (b) in a sectional view of the centerpiece according to section B-B of FIG. 7*a*; (c) in a perspective view of the centerpiece; (d) in a perspective view of the composite gear blank with a sector cut away;

FIG. 8 shows a fourth embodiment of a composite gear blank ("T-holes"): (a) in a plan view of the centerpiece; (b) in a sectional view of the centerpiece according to section B-B of FIG. 8*a*; (c) in a perspective view of the centerpiece; (d) in a perspective view of the composite gear blank with a sector cut away;

FIG. 9 shows a fifth embodiment of a composite gear blank ("swallow-tail"): (a) in a plan view of the centerpiece; (b) in a sectional view of the centerpiece according to section B-B of FIG. 9*a*; (c) in a perspective view of the centerpiece; (d) in a perspective view of the composite gear blank with a sector cut away;

DETAILED DESCRIPTION OF THE PREFERRED EMBODIMENTS

Figure 1:
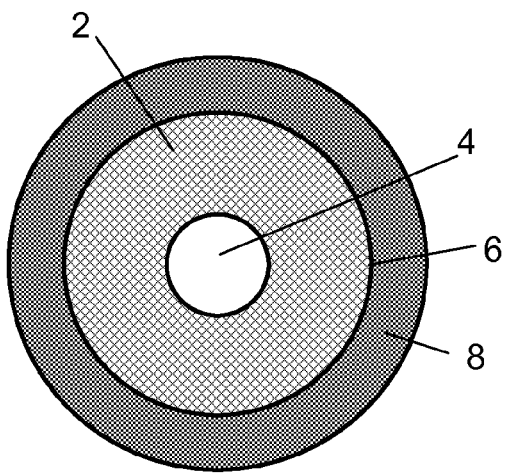
FIG. 1 shows a first embodiment of the composite gear blank, in a plan view.

Therefore, according to a first aspect of this invention, there is provided a composite gear blank comprising a rigid centerpiece and an outer part made of a plastic material, the centerpiece being substantially disk-shaped with two disk-faces substantially parallel to each other, the outer part being cast around a peripheral surface of the centerpiece, wherein the composite gear blank has the following properties:

a) when determined at a temperature of up to 25° C.:
  a normal adhesion strength $S_N$ between outer part and centerpiece of at least 17 MPa;
  a shear adhesion strength $S_S$ between outer part and centerpiece of at least 16 MPa;
  and:
b) when determined at a higher temperature up to 120° C.:
  a normal adhesion strength $S_N$ between outer part and centerpiece of at least 11 MPa;
  a shear adhesion strength $S_S$ between outer part and centerpiece of at least 16 MPa.

wherein the normal adhesion strength $S_N$ is determined by applying a rai-dally outward load with a constant velocity of 5 mm/min and wherein the shear adhesion strength $S_S$ is determined by taking the lower value of:
i) a tangential adhesion strength $S_T$ obtained by applying a tangential load with a constant velocity of 3 rad/min, and
ii) an axial adhesion strength $S_A$ obtained by applying an axial load with a constant velocity of 1 mm/min.

According to yet another aspect of this invention, a method for manufacturing such a composite gear blank comprises the steps of:
a) providing at least one rigid centerpiece having a structured peripheral surface to be surrounded by a plastic material;
b) carrying out a surface roughening step on the peripheral surface;
c) subjecting the centerpiece to a surface conditioning step;
d) placing the centerpiece in a mold;
e) inertizing the mold by flushing with an inert gas;
f) adding a liquid reactive mixture into the mold until filling up the mold around the centerpiece;
g) applying a static pressure to the filled up mold;
h) allowing polymerization of the reactive mixture so as to form the outer part;

the surface conditioning step comprising brushing an organofunctional silane compound onto the peripheral surface, and after step h), the centerpiece being subjected to a controlled heating step so as to locally melt the plastic material in a region adjacent to the centerpiece, followed by a controlled forced cooling of the centerpiece so as to avoid excessive heating and degradation of the plastic material. Advantageously, the organofunctional silane compound is an alkoxy silane.

According to still a further aspect of this invention, a method for manufacturing such a composite gear blank comprises the steps of:
a) providing at least one rigid centerpiece having a peripheral surface to be surrounded by a plastic material;
b) subjecting the centerpiece to a surface degreasing step;
c) placing the centerpiece in a mold;
d) inertizing the mold by flushing with an inert gas;
e) adding a liquid reactive mixture into the mold until filling up the mold around the centerpiece;
f) applying a static pressure to the filled up mold;
g) allowing polymerization of the reactive mixture so as to form an associated outer part;

the centerpiece having a plurality of undercuts or recesses having an extension in a radial direction of at least 1.35 mm, with the undercuts or recesses being filled with the plastic material in step e) or f), thereby providing a mechanical lock between the outer part and the centerpiece in radial, axial and tangential directions of said centerpiece. Optionally, the centerpiece is subjected to a controlled heating step so as to locally melt the plastic material in a region adjacent to the centerpiece, followed by a controlled forced cooling of the centerpiece so as to avoid excessive heating and degradation of the plastic material. Advantageously, the method further comprises carrying out a surface roughening step on the peripheral surface between steps a) and b).

It will be understood that both of the above methods may be generally referred to as a "direct casting process" because the plastic outer part is formed starting with a liquid precursor, namely a liquid reactive mixture, that is introduced in a confined volume surrounding the centerpiece. An important aspect of the present invention lies in the fact that the polymerization of the reactive precursor is carried out under a static pressure, i.e. in a generally non-rotating mold. By applying a static pressure to the mold after filling the same with the liquid precursor, the latter is driven radially inwards against the centerpiece during the polymerization process. In this manner, one ensures that any recesses, cavities or other concave structures of the centerpiece are properly filled, thus resulting in an optimum interface between the plastic outer part and the centerpiece. Preferably, the static pressure is in the range of about 5 bar to about 20 bar.

Various advantageous embodiments are defined in the dependent claims.

In accordance with the intended application of the composite gear blank, the centerpiece will have an outer diameter of about 60 mm to about 90 mm, preferably about 65 mm to about 85 mm. For certain applications such as in quad bikes, an outer diameter of about 64 mm to about 66 mm will be preferable. However, for automobiles, the centerpiece will generally have an outer diameter of about 70 mm to 80 mm, preferably about 74 mm to 76 mm and particularly about 75 mm.

In principle, various plastic materials may be envisioned to form the outer part. Suitable materials to be produced by direct casting are polyamides such as polyamide 6, polyamide 6,12 and polyamide 12 but also polyurethanes and polystyrenes. Preferably, however, the outer part is made of cast polyamide 6. It will be understood that in order to produce these materials by direct casting one starts with an appropriate liquid reactive precursor, such as ε-caprolactam in the case of polyamide 6. It will also be appreciated that the reactive precursor will generally include a number of additives such as catalysts, heat stabilizers, colorants, cross-linkers, internal lubricants etc., as well known in the art.

Also, various rigid materials, particularly metals or fiber reinforced plastics could be used for the centerpiece. Preferably, however, the rigid centerpiece is made of steel. In particular, the rigid centerpiece is made of an unalloyed carbon steel such as S25C (also denoted as 1.1158 steel, DIN17200, CK25).

In a preferred embodiment the peripheral surface of the centerpiece is textured or knurled. Moreover, the centerpiece may be provided with recesses, rims or undercuts filled with said plastic material so as to provide a mechanical lock between the outer part and said centerpiece in radial, axial and tangential direction of the centerpiece.

In a further preferred embodiment, the plastic outer part is cast in such a manner as to substantially overlap at least one of the disk faces. Such a configuration provides additional strength in the axial direction, i.e. against an axial displacement of the plastic outer part and the centerpiece.

In still another embodiment, the composite gear blank further comprises a surrounding region made of a further plastic material arranged concentrically around the outer part. In particular, the further plastic material is a high-performance polymer, particularly PEEK. This hybrid arrangement allows to benefit from the mechanical advantages of the high-performance polymer in the critical peripheral region of the gear while reducing cost by using a lower-price polymer such as cast polyamide 6 for the inner part of the plastic ring. To produce such a hybrid part, a preformed ring of the high-performance polymer is placed in the mold before the casting process.

In order to ensure sufficient adhesion strength between the outer and inner plastic rings, the preformed outer ring could be made with a structure that results in mechanical locking with the inner plastic ring.

Depending on the specific application of the composite gear blank, the plastic outer part may be made with preformed teeth.

In an advantageous embodiment of the manufacturing process, the surface roughening comprises blasting with steel grit, which was found to provide better adhesion strength in the finished product. Moreover, it has been found advantageous to preheat the mold before the step of placing the centerpiece therein.

In yet a further embodiment, step a) comprises providing an assembly of a plurality of rigid centerpieces lined up on an elongated holder element, each pair of adjacent centerpieces being separated by a spacer element. The plurality of composite gear blanks thus formed is then disassembled. In general, this allows production of a plurality of composite gear blanks in one given molding cycle and thus may contribute to lower the production costs.

Figure 2:
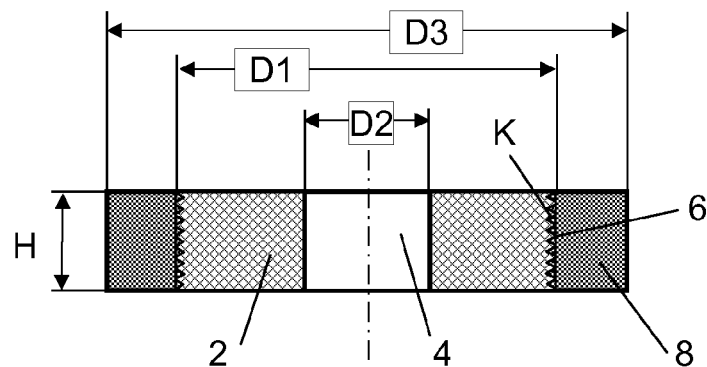
FIG. 2 shows the gear blank of FIG. 1, in a cross-sectional view.
Figure 3:
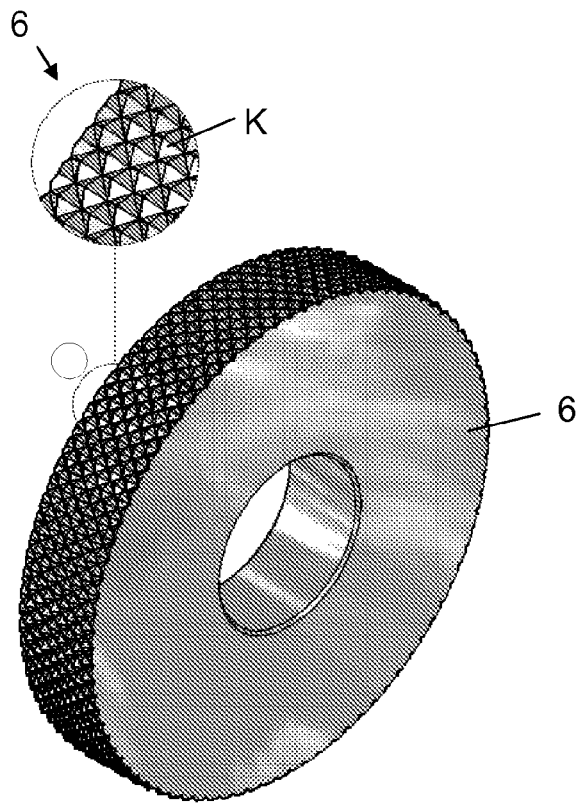
FIG. 3 shows the centerpiece of the gear blank of FIG. 1, in a perspective view, including a magnified portion of the knurled peripheral surface.

The composite gear blank shown in FIGS. 1 to 3 comprises a disk-shaped rigid centerpiece 2 with a central opening 4 for mounting on a shaft and a peripheral surface 6. The centerpiece has an outer diameter D1 and a thickness H, whereas the central opening has an inner diameter D2. A ring-shaped outer part 8 made of a plastic material and having an outer diameter D3 is arranged in adjacent manner around the peripheral surface 6. In order to provide for a good mechanical connection between the centerpiece and the outer part, the peripheral surface 6 is provided with a knurled structure K. As will be discussed in more detail below, the plastic outer part 8 is formed around the centerpiece by a direct casting method.

Figure 4:
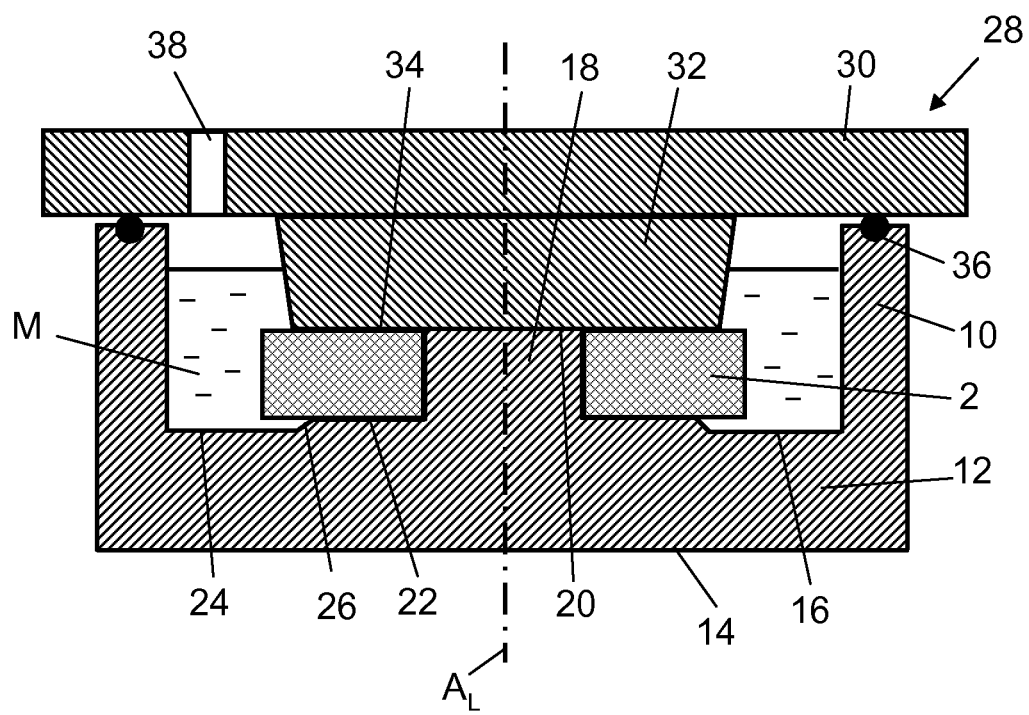
FIG. 4 shows a molding device for manufacturing a composite gear blank, in a vertical sectional view.

The composite gear blanks are manufactured with a molding device as shown schematically in FIG. 4. The device comprises a cup-like cylindrical chamber 10 with a longitudinal axis $A_L$ arranged substantially vertical. The chamber has an inner diameter that is somewhat larger than D3, i.e. the outer diameter of the plastic outer part to be formed. The chamber has an integral base plate 12 with a bottom face 14 and an upper face 16 from which protrudes upward a central cylindrical stub 18 with a flat top portion 20. The outer diameter of stub 18 corresponds to D2, i.e. to the inner diameter of the central opening of the centerpiece 2 and it has a height that is substantially equal to the thickness H of the centerpiece 2. The cylindrical stub protrudes from a first upper face portion 22 which is surrounded by a second upper face portion 24 extending all the way to the periphery of the base plate. As also seen from FIG. 4, the second upper face portion 24 is displaced downward in respect of the first upper face portion 22, and there is an oblique transition face 26 in the region between the two portions.

The molding device further comprises a cover plate member 28 with a lid portion 30 dimensioned so as to overlap the entire cylindrical chamber 10. Moreover, the cover plate member is provided on its lower side with a central stub 32 shaped as a conical section with a flat bottom face portion 34. In order to form a medium-tight seal between cover plate member 28 and cylindrical chamber 10, a groove 36 for a corresponding O-ring is formed in the upper face region of chamber 10.

Also shown in FIG. 4 is an annular centerpiece 2 arranged around cylindrical stub 18. In particular, it is seen that the outer diameter (D1) of the centerpiece is somewhat larger than the diameters of the first upper face portion 22 and of the bottom face portion 34. As seen from FIG. 4, the chamber is dimensioned in such way that the flat bottom face portion 34 of the cover plate member 28 abuts against the flat top portion 20 of cylindrical stub 18 when the cover plate member 28 rests on the cylindrical chamber 10 and compresses the O-ring in groove 36.

A reactive liquid mixture M has been poured into the cavity formed between the base plate and the cover plate member. As clearly seen in FIG. 4, the upper level of the reactive liquid mixture is above the upper face of centerpiece 2 whereas the lower level or the reactive liquid mixture is below the lower face of centerpiece 2. This means that polymerization of the reactive mixture will yield a plastic mass that overlaps the periphery of the centerpiece above and below the same in C-like manner. The casting process is carried out using an overpressure of an inert gas supplied through an opening 38 of the cover plate member.

It will be understood that the above described device comprises further components such as a frame and appropriate means for raising and lowering the cover plate member, means for securing the cover plate member to the cylindrical chamber in order to pressurize the mold, means for sensing temperature and pressure, and means for preheating the mold. Advantageously, the inner surfaces of the molding device are chromium-plated so as to ease removal of the finished gear blank from the mold.

The casting process is now described in more detail for a composite gear blank of the type shown in FIGS. 1 to 3 having an outer part made of cast polyamide 6.

One starts with a rigid centerpiece 2, which is preferably made of an unalloyed carbon steel, and provides its peripheral surface with a suitable structuring, such as a knurling with pyramidal protrusions of about 1 mm. Subsequently, the peripheral surface is first roughened up by blasting with steel grit and then subjected to a surface conditioning step. The surface conditioning generally comprises a cleaning step to degrease the centerpiece, e.g. by rinsing with acetone or another degreasing solvent or with an ultrasound treatment in a cleaning liquid. Most importantly, the surface conditioning step is concluded by brushing an organofunctional silane compound, which preferably will be an alkoxy silane, onto the peripheral surface. Suitable alkoxysilanes may be obtained, for example, from Dow Corning Corporation as "Z-6020 Silane" (primarily containing aminoethylaminoproplytrimethoxysilane and methoxysilane) or "Z-6032 Silane" (primarily containing aminoethylaminoproplytrimethoxysilane, aminosilane hydrochloride and methanol).

In a next step, the centerpiece is placed in a mold as already described in the preceding section. The mold chamber is pre-heated to a temperature between 140° and 170° C. Moreover, the mold is inertized by flushing with a gas such as nitrogen or argon.

Thereafter, a liquid reactive mixture is introduced in the mold until filling up the mold and surrounding the centerpiece as already outlined above. The technique of casting polyamide 6 is generally known. In the present case, a two-streamer procedure was adopted where a first supply tank provides monomer plus initiator, heat stabilizer and any colorants whereas a second supply tank provides monomer plus catalyst. The liquid reactive mixture thus formed has a temperature between 120 and 150° C. when being filled into the mold.

Subsequently, a pressure of an inert gas such as nitrogen or argon ranging from about 5 bar up to about 20 bar is applied to the mold, thus forcing the liquid reactive mixture into the surface recesses of the knurled centerpiece. Thereafter, the reactive mixture is allowed to polymerize so as to form a raw shape of the plastic outer part. The pressure is then released and the composite part thus formed is taken out of the molding device.

In a further step, the composite gear blank is transferred to an induction heating device where the centerpiece is heated up according to a predetermined protocol. Thereby, the plastic material in a region adjacent to the centerpiece is heated up sufficiently so as to locally melt. The adequate heating protocol will generally depend on the size of the gear blank and should be determined in preliminary tests. In the case of a gear blank with a ring shaped steel centerpiece having an outer diameter of 75 mm and a thickness of 13 mm surrounded by a polyamide 6 ring with an outer diameter of 95 mm, a single heating step of about 12 sec with a power of about 6 kW will be appropriate to cause controlled local melting of the plastic material. The heating step is followed by a controlled forced cooling of the centerpiece, e.g. by clamping the centerpiece between a pair of appropriately cooled metal plates, so as to avoid excessive heating and degradation of the plastic material. The above described combination of local fusion and subsequent cooling leads to a significant improvement of adhesion strength between the plastic material and the centerpiece.

Finally, in order to avoid any problems concerning dimensional stability, the finished part is subjected to an annealing process, e.g. 24 hours at a temperature between 140° and 170° C.

It will be understood that any excess plastic material formed in the casting process is machined off.

Figure 5:
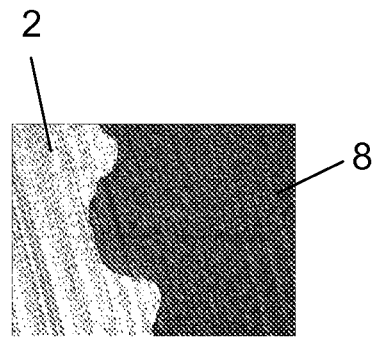
FIG. 5 shows a photographic plan view of the contact region between the structured outer part and the centerpiece of a composite gear blank.

As may be seen from FIG. 5, the above described process allows production of a composite gear blank in which the plastic material of the outer part is intimately shaped around the knurled structure of the centerpiece, which is a prerequisite for good adhesion strength between the two parts.

Without being bound by theory, it appears that the high level of normal and shear adhesion strength between the outer part and centerpiece that may be obtained with the above described method results from a combination of (i) the force connection provided by the surface conditioning, and (ii) by some mechanical locking action provided by the surface roughening of the centerpiece surface. It was found that the application of a static pressure to the mold containing the liquid reactive mixture is essential for reaching a good adhesion strength.

Figure 6:
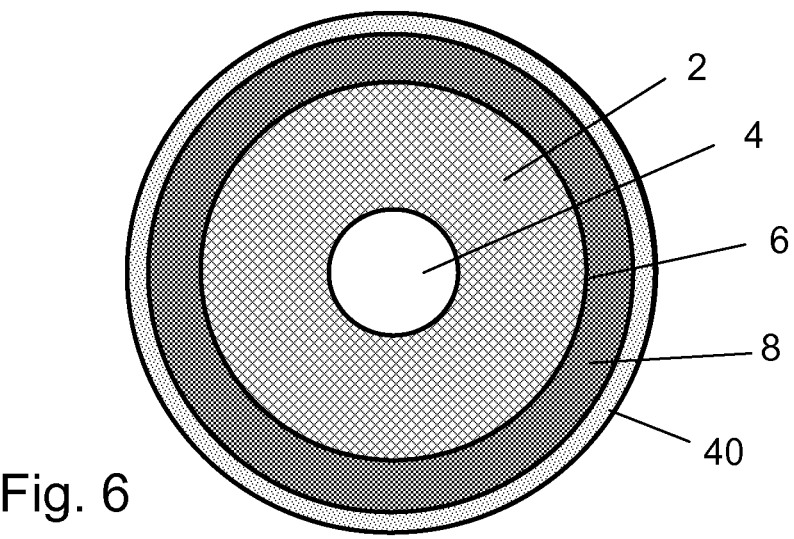
FIG. 6 shows a second embodiment of a composite gear blank, in a plan view.

In a further embodiment shown in FIG. 6, an annular region 40 made of polyetheretherketone (PEEK) is arranged concentrically around the polyamide 6 part 8. To produce such a part, the molding process will include placing an appropriately dimensioned PEEK ring into the mold together with the rigid centerpiece 2 before adding the liquid reactive mixture M. In order to have the PEEK ring at the same height as the centerpiece, one may use a molding chamber with a base plate having a third, peripheral upper face portion that is substantially co-planar with the first upper face portion 22. Alternatively, one may start with a PEEK ring that is thicker than the polyamide 6 part to be formed; after formation of the gear blank, any unwanted thickness of the PEEK ring can be machined off. The PEEK ring may be provided with pre-formed outer teeth. For example, such an arrangement may comprise a steel centerpiece with an outer diameter of about 75 mm, an adjacent polyamide 6 ring with an outer diameter of about 85 mm and an outer PEEK ring with an outer diameter of about 95 mm.

FIGS. 7 to 9 show further embodiments of the composite gear blank wherein the centerpiece is provided with recesses, rims or undercuts filled with the plastic material of the outer part so as to provide a mechanical lock between the outer part and the centerpiece in a radial (R), axial (A) and tangential (T) direction thereof. For ease of reference, the following description will refer to the centerpiece being arranged horizontally, i.e. with its axis of rotation A arranged vertically.

The centerpiece 102 shown in FIG. 7 is symmetric with respect to an equatorial plane. It has a central portion 104 with an upper face 106 and lower face 108 that are substantially horizontal, thus defining a maximum thickness H of the centerpiece. Adjacent to the central portion 104 there is an upper rim 110 and a lower rim 112 forming step-like transitions to a thinner peripheral portion 114 formed with a uniformly sloped upper face 116 and lower face 118 converging to an outermost peripheral surface 120, which defines a minimum thickness $H_1$ of the centerpiece. Moreover, the peripheral portion 114 is provided with eight cylindrical axial holes 122 that are distributed uniformly along the circumference of the centerpiece. As seen from FIG. 7*d*, the plastic outer part 124 overlaps the peripheral portion 114 in C-like manner, thus providing a mechanical lock in axial direction. By virtue of the fact that the plastic material of the outer part 124 fills the axial through-holes 122 and also embraces the peripheral portion 114, there is also provided a mechanical lock in radial and tangential direction. For a centerpiece 102 with an outer diameter of 75 mm, the axial holes 122 will have a diameter of e.g. about 6 mm.

The centerpiece 202 shown in FIG. 8 is disk-shaped with a uniform thickness H and is provided with eight cylindrical axial through-holes 204 that are distributed uniformly along the circumference of the centerpiece. Each one of these axial through-holes 204 is provided with a corresponding radial hole 206 forming a channel from the axial through-hole to the peripheral surface 208 of the centerpiece 202. By virtue of the fact that the plastic material of the outer part 210 fills the radial holes 206 and axial holes 204, it forms a plurality of T-shaped plastic stubs 212 within the centerpiece 202 which provide a mechanical lock in axial, radial and tangential direction. In this example, the centerpiece 202 has an outer diameter of 75 mm and a thickness of 13 mm, with the axial through-holes 204 and the corresponding radial holes 206 having a diameter of e.g. about 8 mm.

The recesses or undercuts of the embodiments described in connection with FIGS. 7, 8 and 9 will generally be dimensioned so as to ensure sufficient mechanical stability of the metallic and plastic structures forming the mechanical lock in axial, radial and tangential direction. In particular, the recesses or undercuts may have an extension in radial direction of at least 1.35 mm, but also substantially more like 1.5 mm, 2 mm or even larger. Such composite gear blanks will also be addressed here as "macro-locked" (i.e. mechanically locked in axial, radial and tangential direction). The manufacturing of these parts does not necessitate any specific surface conditioning treatment other than a degreasing step, although it may be useful to include a surface roughening such as steel grit blasting as an optional manufacturing step. Moreover, the manufacturing of macro-locked composite gear blanks does not necessarily require the step of heating up the centerpiece to locally melt the plastic material in a region adjacent to the centerpiece, although such a step may be included as an option. This is an important finding because achieving controlled local melting of the plastic material by just heating up the centerpiece with an induction device turns out to be essentially impossible for parts having large recesses of e.g. more than 1.35 mm. It was found that the application of a static pressure to the mold containing the liquid reactive mixture is essential for reaching a good adhesion strength in macro-locked composite gear blanks.

By virtue of the mechanical locking action, the normal and shear adhesion strength in macro-locked parts is not limited by adhesion forces at the interface; rather than that, the adhesion strength is merely limited by the material strength of the plastic part and of the centerpiece. This means that the various geometric structures that provide the locking need to be dimensioned accordingly.

The macro-locked embodiments described in FIGS. 7, 8 and 9 can be manufactured by simple direct casting, i.e. by placing the centerpiece in the mold and filling in the liquid reactive mixture so as to fill up any recesses or undercuts. There is no need to insert any barriers to prevent the liquid reactive mixture from entering any cavities that should not be filled therewith.

It will be understood that the macro-locking embodiments described in connection with FIGS. 7, 8 and 9 may be combined with the embodiment described in connection with FIG. 6, i.e. the composite gear blanks may be provided with an outer annular region made of a further plastic material such as PEEK.

Figure 10:
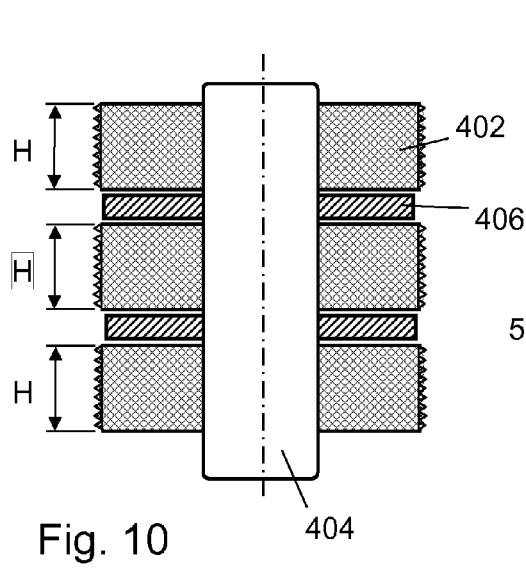
FIG. 10 shows a step in the manufacturing of a plurality of composite gear blanks.

FIG. 10 illustrates a key step of a further embodiment of the manufacturing process, which may be used to produce any of the gear blank embodiments described above. As shown in FIG. 10, a plurality of three rigid centerpieces 402 having a thickness H are lined up on a rod-shaped holder element 404. The outer diameter of rod 404 is just slightly smaller than the inner diameter of the centerpieces, so as to allow slidability thereof along the rod while preventing any undue radial displacement. Between each pair of adjacent centerpieces there is arranged a disk-shaped spacer element 406 having a central opening corresponding to that of the centerpieces. Typically, the thickness h of the spacer elements 406 will be somewhat smaller than the thickness H of the centerpieces. The spacer elements 406 are made of a material that does not decompose, melt or massively distort under the operating conditions of the mold and thus are easily removed after the casting process has been completed.

It will be understood that the assembly shown schematically in FIG. 10 may be placed in a mold similar to the one described in connection with FIG. 3 but having a central recess in the base plate member instead of a central cylindrical stub. Such recess will be used for receiving rod 404 so as to align and position the assembly shown in FIG. 10 relative to the mold chamber. In the course of the direct casting process, the reactive liquid mixture for making the plastic outer part will be filled into the mold so as to surround all the centerpieces stacked onto the cylindrical rod. After polymerization of the reactive mixture and any required heat treatment or annealing, the cylindrical rod is removed and the assembly is separated into a plurality of composite gear blanks. This may be achieved e.g. by cutting or machining away the disk-shaped spacer elements by placing the assembly into an appropriate tool.

Determination of Adhesion Strength

In order to determine the normal adhesion strength $S_N$ and the shear adhesion strength $S_S$ the following procedures were used. The adhesion strength $S_x$ of the plastic/metal connection in a direction x relative to a surface element of the plastic/metal interface shall be understood here as the maximum force $F_x$ in direction x per surface area A that can be applied without breaking up the plastic/metal connection.

Figure 11:
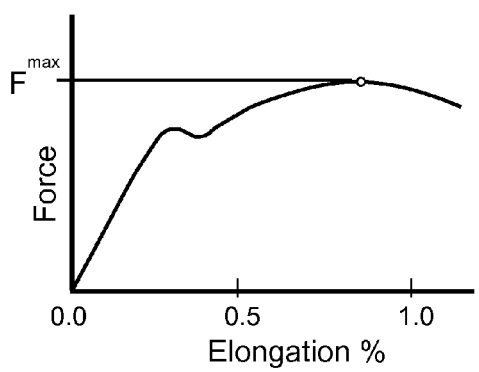
FIG. 11 shows a schematic representation of a typical force vs. elongation diagram for a measurement of adhesion strength.

In practice, the measurements are carried out by applying a load in x direction starting from zero with a constant pulling or pushing speed $v_x$. The load will thus build up correspondingly, leading first to elastic and then to plastic deformation until at some point the composite part fails, which will be either the plastic outer part being drawn away from the centerpiece or the plastic part being torn apart at the site where the force is applied. This is shown schematically in FIG. 11. The maximum force $F_x^{max}$ is obtained as the peak value in the diagram.

The maximum force $F_x^{max}$ thus determined is used to calculate a corresponding adhesion strength according to $S_x = F_x^{max}/A_x$ with $A_x$ denoting the area of the relevant plastic/metal interface.

In the present context, the normal adhesion strength $S_N$ is obtained by determining the maximum force $F_N^{max}$ in a direction normal to the plastic/metal interface, i.e. in radial direction. Because shear adhesion refers to relative displacement in any direction parallel to the plastic/metal interface, i.e. in any direction in the plane of a surface element of the interface, the shear adhesion strength $S_S$ will be calculated by determining the maximum force $F_S^{max}$ applicable without failure in various in-plane directions and then taking the smallest result.

In practice, this is done by determining the maximum force $F_T^{max}$ in tangential direction and the maximum force $F_A^{max}$ in axial direction and taking the smaller of the two.

Figure 12:
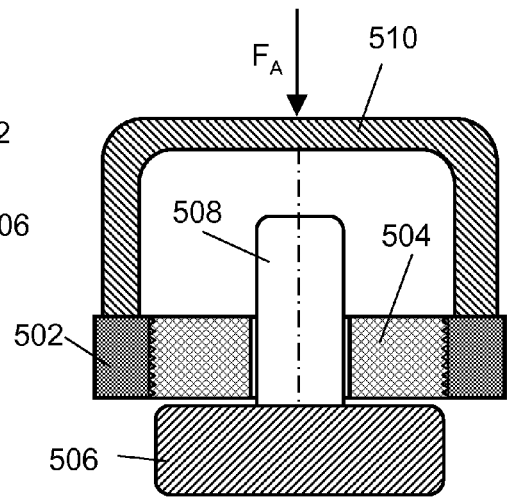
FIG. 12 shows, in a vertical section, an arrangement for determining the axial adhesion strength of a composite gear blank.

As shown in FIG. 12, to determine the axial shear adhesion strength $S_A$ between the plastic outer part 502 and the rigid centerpiece 504 of a composite gear blank, the latter is placed on a base tool comprising a disk-shaped platform 506 and a central cylindrical stub 508. Platform 506 has an outer diameter slightly smaller than that of the centerpiece whereas stub 508 has an outer diameter slightly smaller than the inner diameter of the centerpiece 504. Subsequently, one applies a load at a constant velocity in axial direction generating an increasing axial force $F_A$ by pressing downwards a rigid pressing tool 510 having the shape of an inverse cup onto the plastic outer part.

Figure 13:
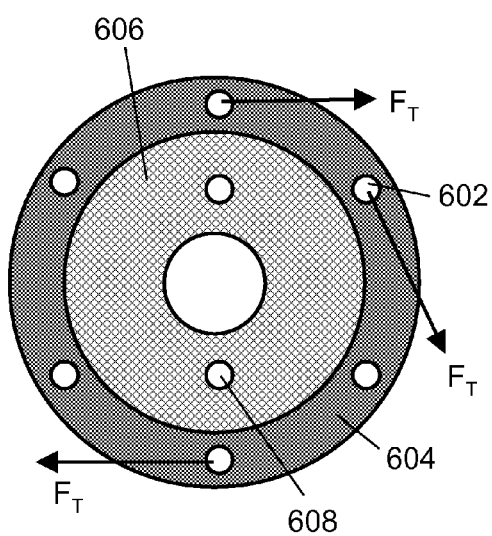
FIG. 13 shows, in a plan view, an arrangement for testing the tangential adhesion force of a composite gear blank.

To determine the tangential adhesion strength $S_T$ a number of peripheral holes 602 are drilled in axial direction through the plastic outer part 604 of a composite gear blank, the hole centers being radially displaced from the rim of the plastic part as shown in FIG. 13. Subsequently one applies a load at a constant velocity in tangential direction generating an increasing tangential force. In order to apply the required tangential forces it will be necessary to prevent the centerpiece 606 from rotating, e.g. by providing the latter with a number of fixing holes 608 into which can be inserted corresponding blocker pins. In practice, one may express the results obtained with a known lever arm in terms of a torque $T_T$ with the subscript T included here to indicate that the torque relates to a force applied in tangential direction.

Figure 14:
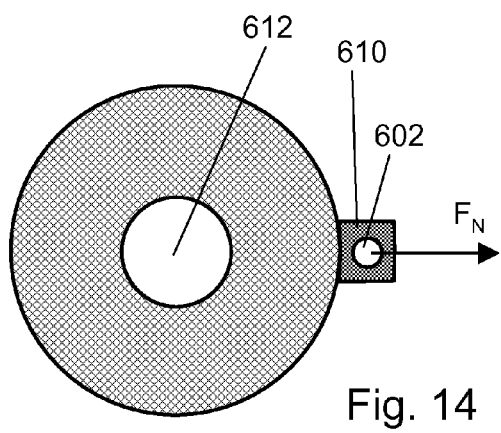
FIG. 14 shows, in a plan view, an arrangement for determining the normal adhesion strength of a composite gear blank.

To determine the normal adhesion strength $S_N$ one starts with an arrangement as shown in FIG. 13 but removes most of the plastic part except for a small testing part 610 around a region provided with the peripheral hole as shown in FIG. 14. Alternatively, one may leave the remainder of the plastic part on the centerpiece and simply make radial cuts that ensure complete separation of the testing part 610 and the remainder of the plastic part. In order to apply the required constant velocity load in radial direction between the plastic part and the centerpiece, one may insert one pin each in the peripheral hole 602 of the plastic part and in the center hole 612 of the centerpiece, which pins are then pulling apart with a constant velocity.

In accordance with established testing procedures, all the adhesion strength determinations reported in the following examples were carried out with constant velocity loads specified as follows:

Axial load measurements: velocity $v_A$=1 mm/min
Radial load measurements: velocity $v_N$=5 mm/min
Tangential load measurements: radial velocity=3 rad/min.

However, it should be emphasized that other procedures for determining shear adhesion strength and normal adhesion strength can be adopted. Such procedures would be expected to yield somewhat other numerical values for $S_S$ and $S_N$ than the procedures used here. But the relative performance of the various types of composite gear blanks manufactured according to the methods described above would not be affected by the specific procedure used to measure $S_S$ and $S_N$.

EXAMPLES

The following examples refer to composite gear blanks each comprising a ring-shaped centerpiece made of S25C carbon steel (also denoted as 1.1158 steel, DIN17200, CK25) having the following dimensions:

outer diameter of centerpiece: D1=75 mm
inner diameter of central opening: D2=25.50 mm
thickness of centerpiece: H=13 mm.

The peripheral surface of some of the centerpieces (comparative examples A1, A2, B1, B2, B3, C1, C2 and examples X1 and X2) was knurled, i.e. it was machined with pyramidal protrusions of about 1 mm. In contrast, the data of example Y and Z were obtained with macro-locking structures according to the two embodiments described above in connection with FIGS. 8 and 9, respectively.

The plastic outer part of each gear blank was made by direct casting polyamide 6 as described above and has an outer diameter D3=95 mm.

The shear adhesion strength $S_S$ determined for the above examples X1, X2, Y and Z was above the upper measurement limit of 16.3 MPa. The normal adhesion strength $S_N$ determined for the two composite gear blanks with macro-locking structures Y and Z was substantially determined by the strength of the polyamide ring material against breaking.

TABLE

Normal and shear adhesion strength of composite gear blanks

| | Comparative examples (prior art) | | | | | | | Examples (invention) | | | |
|---|---|---|---|---|---|---|---|---|---|---|---|
| No. | A1 | A2 | B1 | B2 | B3 | C1 | C2 | X1 | X2 | Y | Z |
| Knurling | X | X | X | X | X | X | X | X | X | | |
| Macro-Lock | | | | | | | | | | X | X |
| Glass beads | | | | | | X | | | | | |
| Steel grit | X | X | X | X | X | | | X | X | X | |
| Acetone rinse | X | | | | | | | | | X | X |
| Ultrasonic | | X | X | X | X | X | X | X | X | | |
| Silane roll on | | | X | | | | | | | | |
| Silane brush | | | | X | X | | | X | X | | |
| Fusion | | | | | | X | X | X | X | | |
| $S_N$ (MPa) 23° C. | 4.7 | 4.9 | 8.0 | 9.7 | 10.7 | 14.4 | 18.6 | 24.1 | 27.7 | 60 | 58 |
| $S_S$ (MPa) 23° C. | 6.5 | 6.5 | 8.2 | 9.8 | 9.8 | 11.4 | 14.7 | >16.3 | >16.3 | >16.3 | >16.3 |
| $S_N$ (MPa) 120° C. | | | | | 3.6 | | | | 12.1 | 34 | 33 |
| $S_S$ (MPa) 120° C. | 3.2 | 3.2 | 4.9 | 5.9 | 5.9 | 6.5 | 8.2 | >16.3 | >16.3 | >16.3 | >16.3 |

Comments:

The shear adhesion strength $S_S$ determined for the above examples X1, X2, Y and Z was above the upper measurement limit of 16.3 MPa. The normal adhesion strength $S_N$ determined for the two composite gear blanks with macro-locking structures Y and Z was substantially determined by the strength of the polyamide ring material against breaking.

As a further comparative example, a small series of composite gear blanks was manufactured in accordance with the disclosure of DE 101 27 224 A1. For this purpose a knurled centerpiece was used without specific surface conditioning, i.e. merely degreasing but no glass bead or steel grit treatment and no silane treatment, and without any fusion step. This gave a normal adhesion strength $S_N$ at 23° C. of less than 1 MPa.

With the direct casting methods of the present invention it is possible to manufacture composite gear blanks that have improved shear adhesion strength $S_S$ and normal adhesion strength $S_N$—both at room temperature and at elevated temperatures of up to 120° C.—as compared to equally sized gear blanks of the same material that were made with previously known methods. This finding has been documented with the above examples using specific procedures for determining $S_S$ and $S_N$. However, the relative performance of the various types of composite gear blanks manufactured according to the various methods compared here will not depend on the particular procedure used to determine $S_S$ and $S_N$. In other words, the advantages provided by the direct casting methods according to the two above defined aspects of this invention will also be evident if one uses other procedures for determining $S_S$ and $S_N$. Correspondingly, one may consider using a procedure that is simpler and better adapted for testing large numbers of slightly different gear blanks in order to further optimize the manufacturing method or for quality control purposes.

The invention claimed is:

1. A method of manufacturing a composite gear blank, comprising a rigid centerpiece and an outer part made of a plastic material, said centerpiece being substantially disk-shaped with two disk-faces substantially parallel to each other, said outer part being cast around a peripheral surface of said centerpiece, wherein said composite gear blank has the following properties:
   a) when determined at a temperature of up to 25° C.:
      a normal adhesion strength $S_N$ between outer part and centerpiece of at least 17 MPa;
      a shear adhesion strength $S_S$ between outer part and centerpiece of at least 16 MPa;
   and
   b) when determined at a higher temperature of up to 120° C.:
      a normal adhesion strength $S_N$ between outer part and centerpiece of at least 11 MPa;
      a shear adhesion strength $S_S$ between outer part and centerpiece of at least 16 MPa;
   wherein said normal adhesion strength $S_N$ is determined by applying a radially outward load with a constant velocity of 5 mm/min and wherein said shear adhesion strength $S_S$ is determined by taking the lower value of:
   i) a tangential adhesion strength $S_T$ obtained by applying a tangential load with a constant velocity of 3 rad/min, and
   ii) an axial adhesion strength $S_A$ obtained by applying an axial load with a constant velocity of 1 mm/min, comprising the steps of:
   a) providing at least one rigid centerpiece having a structured peripheral surface to be surrounded by said plastic material;
   b) surface roughening said peripheral surface;
   c) surface conditioning the centerpiece;
   d) placing the centerpiece in a mold;
   e) optionally inertizing the mold by flushing with an inert gas;
   f) adding a liquid reactive mixture into the mold until the liquid reaction mixture at least partially surrounds the centerpiece;
   g) applying a static pressure to the mold containing the liquid reactive mixture;
   h) polymerizing the reactive mixture to form said outer part;
wherein surface conditioning comprises applying an organo-functional silane compound onto the peripheral surface and wherein, after step h), the centerpiece is subjected to a controlled heating step so as to locally melt the plastic material in a region adjacent to the centerpiece, followed by forced cooling of the centerpiece.

2. The method of claim 1, further comprising surface roughening said peripheral surface between steps a) and b).

3. The method of claim 1, wherein said surface roughening comprises blasting with steel grit.

4. The method of claim 1, wherein said mold is preheated before placing the centerpiece therein.

5. The method of claim 1, wherein step a) comprises providing an assembly of a plurality of rigid centerpieces lined up on an elongated holder element, each pair of adjacent centerpieces being separated by a spacer element, the method further comprising the step of disassembling the plurality of composite gear blanks formed after polymerizing said reactive mixture.

6. The method of claim 1, wherein a ring shaped part of a further plastic material is placed in the mold before adding a liquid reactive mixture into the mold between the centerpiece and the further plastic material.

7. The method of claim 1, wherein the static pressure exerted upon the liquid reactive mixture is from about 5 bar to about 20 bar.

8. The method of claim 1, wherein the static pressure exerted upon the liquid reactive mixture is supplied by an inert gas.

9. The method of claim 7, wherein the static pressure exerted upon the liquid reactive mixture is supplied by an inert gas.

10. The method of claim 8, wherein the inert gas is admitted to the mold through holes in an upper surface thereof.

11. The method of claim 5, wherein the static pressure exerted upon the liquid reactive mixture is from about 5 bar to about 20 bar.

12. The method of claim 5, wherein the static pressure exerted upon the liquid reactive mixture is supplied by an inert gas.

13. The method of claim 6, wherein the static pressure exerted upon the liquid reactive mixture is from about 5 bar to about 20 bar.

14. The method of claim 6, wherein the static pressure exerted upon the liquid reactive mixture is supplied by an inert gas.

15. The method of claim 1, consisting of steps a) through h), in the order recited.

16. The method of claim 6, consisting of steps a) through h), and the placing of the further plastic material, in the order recited.

* * * * *

UNITED STATES PATENT AND TRADEMARK OFFICE
CERTIFICATE OF CORRECTION

| | | |
|---|---|---|
| PATENT NO. | : 9,205,611 B2 | Page 1 of 1 |
| APPLICATION NO. | : 13/256739 | |
| DATED | : December 8, 2015 | |
| INVENTOR(S) | : Oolderink et al. | |

It is certified that error appears in the above-identified patent and that said Letters Patent is hereby corrected as shown below:

In the claims

Column 14, Line 8-9, Claim 1:

After "until the liquid"
Delete "reaction" and
Insert -- reactive --.

Signed and Sealed this
Twenty-ninth Day of March, 2016

Michelle K. Lee
*Director of the United States Patent and Trademark Office*